(12) United States Patent
Issagholian-Havai

(10) Patent No.: US 6,866,308 B2
(45) Date of Patent: Mar. 15, 2005

(54) INTERACTIVE SEALING SYSTEM FOR ARCUATE DUCTS INCLUDING SEAL COMPRESSED AND ACTUATED BY ADJACENT EXPANDING SEAL

(76) Inventor: Robert Issagholian-Havai, 5119 Azusa Canyon Rd., Baldwin Park, CA (US) 91706

( * ) Notice: Subject to any disclaimer, the term of this patent is extended or adjusted under 35 U.S.C. 154(b) by 0 days.

(21) Appl. No.: 10/460,067

(22) Filed: Jun. 12, 2003

(65) Prior Publication Data

US 2004/0250403 A1 Dec. 16, 2004

(51) Int. Cl.[7] ............................................... F16L 21/02
(52) U.S. Cl. ........................ 285/374; 285/351; 285/399
(58) Field of Search .............................. 285/330, 331, 285/342, 343, 348, 351, 374, 375, 382.7, 399

(56) References Cited

U.S. PATENT DOCUMENTS

| | | | | |
|---|---|---|---|---|
| 2,039,886 A | * | 5/1936 | Cohn ........................ 285/330 |
| 2,532,773 A | * | 12/1950 | Kellam ...................... 285/233 |
| 3,955,834 A | * | 5/1976 | Ahlrot ....................... 285/110 |
| 4,753,459 A | * | 6/1988 | Potier ..................... 285/148.17 |
| 4,850,621 A | * | 7/1989 | Umehara .................... 285/322 |
| 4,941,693 A | * | 7/1990 | Spaude et al. .............. 285/331 |
| 5,029,904 A | * | 7/1991 | Hunt .......................... 285/24 |
| 5,213,374 A | * | 5/1993 | Keating ...................... 285/23 |
| 5,697,651 A | * | 12/1997 | Fernandes .................... 285/94 |
| 5,882,048 A | * | 3/1999 | Kawasaki et al. .......... 285/319 |
| 6,170,883 B1 | * | 1/2001 | Mattsson et al. .......... 285/110 |
| 6,193,285 B1 | * | 2/2001 | Proctor ...................... 285/340 |
| 6,279,967 B1 | * | 8/2001 | Proctor et al. ............. 285/340 |
| 6,425,608 B1 | * | 7/2002 | Nordstrom ................. 285/374 |
| 6,431,609 B1 | * | 8/2002 | Andersson .................. 285/24 |

\* cited by examiner

*Primary Examiner*—James M. Hewitt
(74) *Attorney, Agent, or Firm*—Tod R. Nissle, P.C.

(57) ABSTRACT

A system for sealing one end of a first air duct with an adjacent overlapping end of a second air duct incorporates multiple sealing components. One of the sealing components interacts and activates another of the sealing components. One of the sealing components mechanically compressively elastically deforms another of the sealing components.

1 Claim, 6 Drawing Sheets

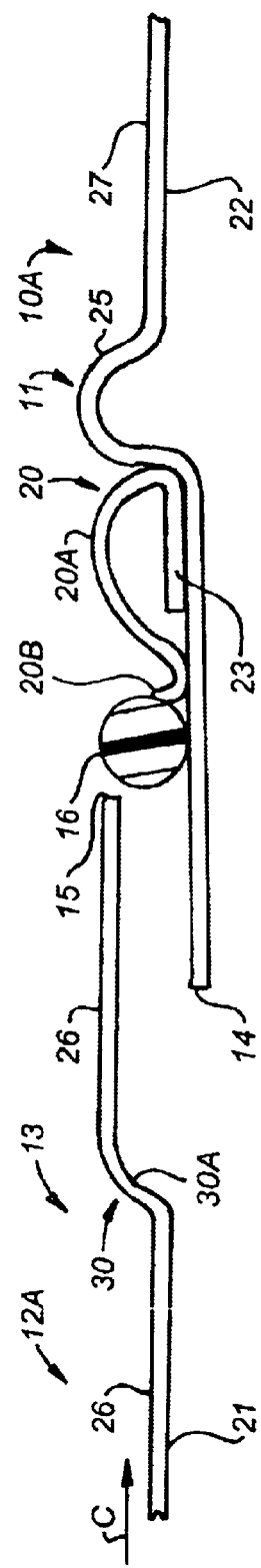

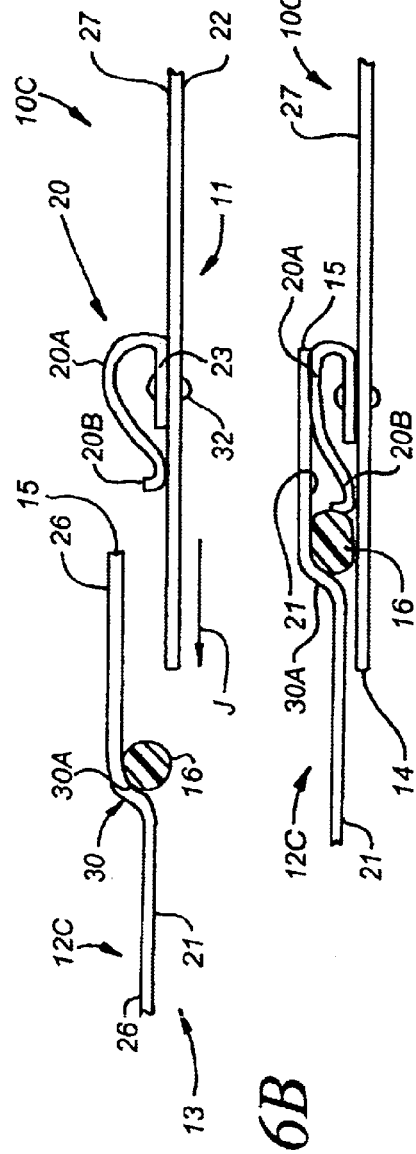
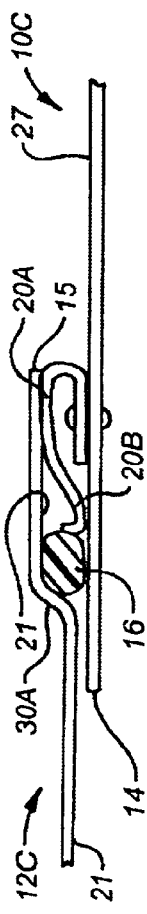
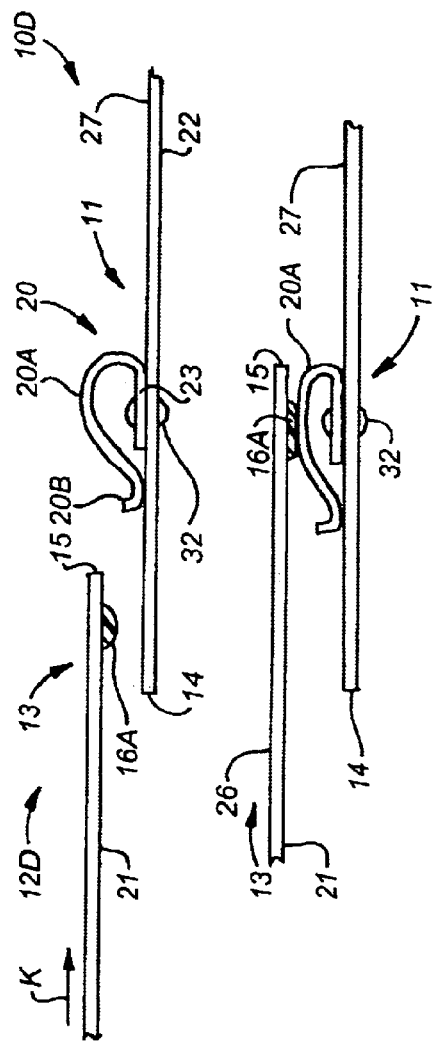
FIG. 6A
FIG. 6B
FIG. 7A
FIG. 7B

US 6,866,308 B2

INTERACTIVE SEALING SYSTEM FOR ARCUATE DUCTS INCLUDING SEAL COMPRESSED AND ACTUATED BY ADJACENT EXPANDING SEAL

CROSS REFERENCE TO RELATED APPLICATIONS

N/A.

STATEMENT REGARDING FEDERALLY SPONSORED RESEARCH OR DEVELOPMENT

N/A.

INCORPORATION-BY-REFERENCE OF MATERIAL SUBMITTED ON A COMPACT DISC (SEE 37 CFR 1.52(e)(5) AND MPEP 608.05

N/A.

BACKGROUND OF THE INVENTION (1) Field of the Invention

This invention pertains to duct systems.

More particularly, the invention pertains to a system for sealing one end of a first air duct with an adjacent overlapping end of a second air duct.

In a further respect, the invention pertains to an air duct sealing system of the type described which incorporates multiple sealing components.

In another respect the invention pertains to an air duct sealing system of the type described in which one of the pair of sealing components interacts with and is used to activate another of the sealing components.

In still a further respect, the invention pertains to an air duct sealing system of the type described in which each sealing component generates forces that improve the sealing action of another sealing component.

(2) Description of Related Art including information disclosed under 37 CFR 1.97 and 1.98.

Arcuate air ducts comprise ducts that include arcuate walls. Arcuate ducts have circular and oval cross sections. A portion of the wall of a duct can be flat, but if the duct also incorporates an arcuate wall, the duct is considered to be an oval duct. For example, the ends or sides of the walls of some ducts have an arcuate semicircular shape, semi-elliptical shape, or other arcuate shape while the wall sections intermediate such ends or sides are flat or substantially flat. Such ducts are considered oval ducts even though a portion of the wall of each such duct is flat. Air ducts are ordinarily used to transport air, but can be utilized to transport other gases or gas mixtures.

A common problem encountered in an air duct system is providing an effective seal at the points at which the end of one duct member overlaps or creates a function with the end of the next successive duct member. Creating an effective seal between the ends of arcuate duct members can be a particular problem because the surfaces that need to be sealed are arcuate and because the degree of curvature of duct surfaces can vary over short distances.

Accordingly, it would be highly desirable to provide an improved system for sealing the adjacent ends of arcuate ducts in an air duct system.

Therefore, it is a principal object of the instant invention to provide an improved duct system.

A further object of the invention is to provide an improved system for sealing the junctions at which the ends of adjacent ducts meet in an air duct system.

Another object of the invention is to provide an improved air duct sealing system that utilizes multiple seals at the junction of the ends of a pair of adjacent air ducts.

Still another object of the invention is to provide an improved air duct sealing system which utilizes interactive seals.

These and other, further and more specific objects and advantages of the invention will be apparent from the following detailed description of the invention, taken in conjunction with the drawings, in which:

BRIEF DESCRIPTION OF THE SEVERAL VIEWS OF THE DRAWING(S)

FIGS. 4A and 4B are side section views illustrating the mode of operation of another embodiment of the duct system of the invention;

FIGS. 6A and 6B are side section views illustrating the mode of operation of still another embodiment of the duct system of the invention; and, FIGS. 7A and 7B are side section views illustrating the mode of operation of still a further embodiment of the duct system of the invention.

BRIEF DESCRIPTION OF THE INVENTION

Briefly, in accordance with my invention, I provide an improved hollow air duct member. The air duct member includes an arcuate wall; and, an end. The end includes an arcuate edge; an arcuate indent spaced apart from the arcuate edge and generally extending peripherally around the member; an elongate elastic member seated in the indent; and, a compression member seated in the indent and deformable to contact and generate compression forces against the elastic member.

In another embodiment of the invention, I provide an improved method of sealing an air duct system. The improved method includes the steps of providing a first hollow arcuate air duct with an overlap end; providing a second hollow arcuate air duct with an insert end; placing at least one elongate elastic member on one of the overlap and insert ends; placing at least one compression member on one of the overlap and insert ends, the compression member being deformable to contact and generate compression forces against the elastic member; and, inserting the insert end in the overlap end such that the compression member is compressed and deformed and contacts and generates compression forces against the elastic member.

DETAILED DESCRIPTION OF THE INVENTION

Figure 1:
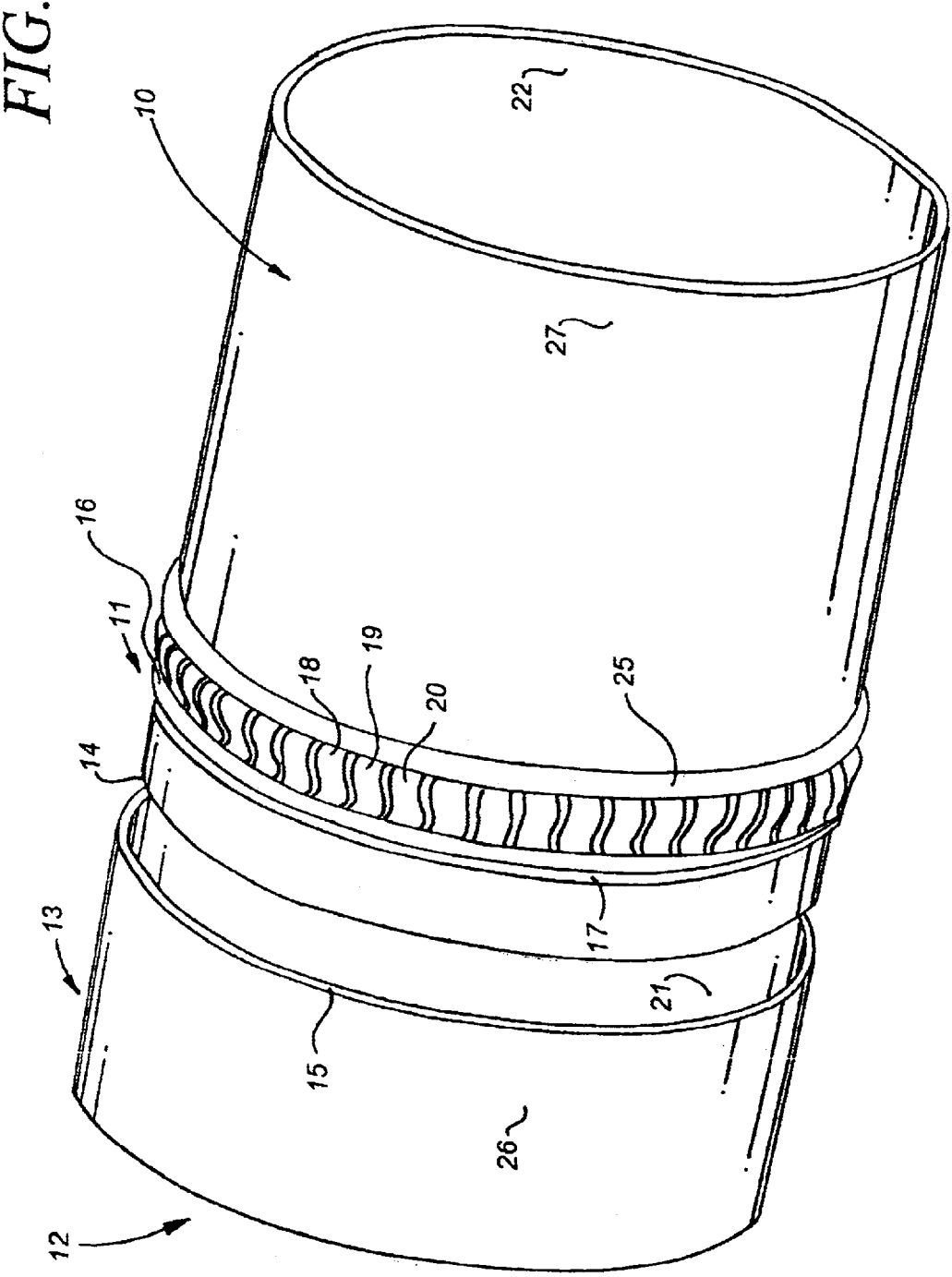
FIG. 1 is a perspective view illustrating a duct system constructed in accordance with the principles of the invention.
Figure 2:
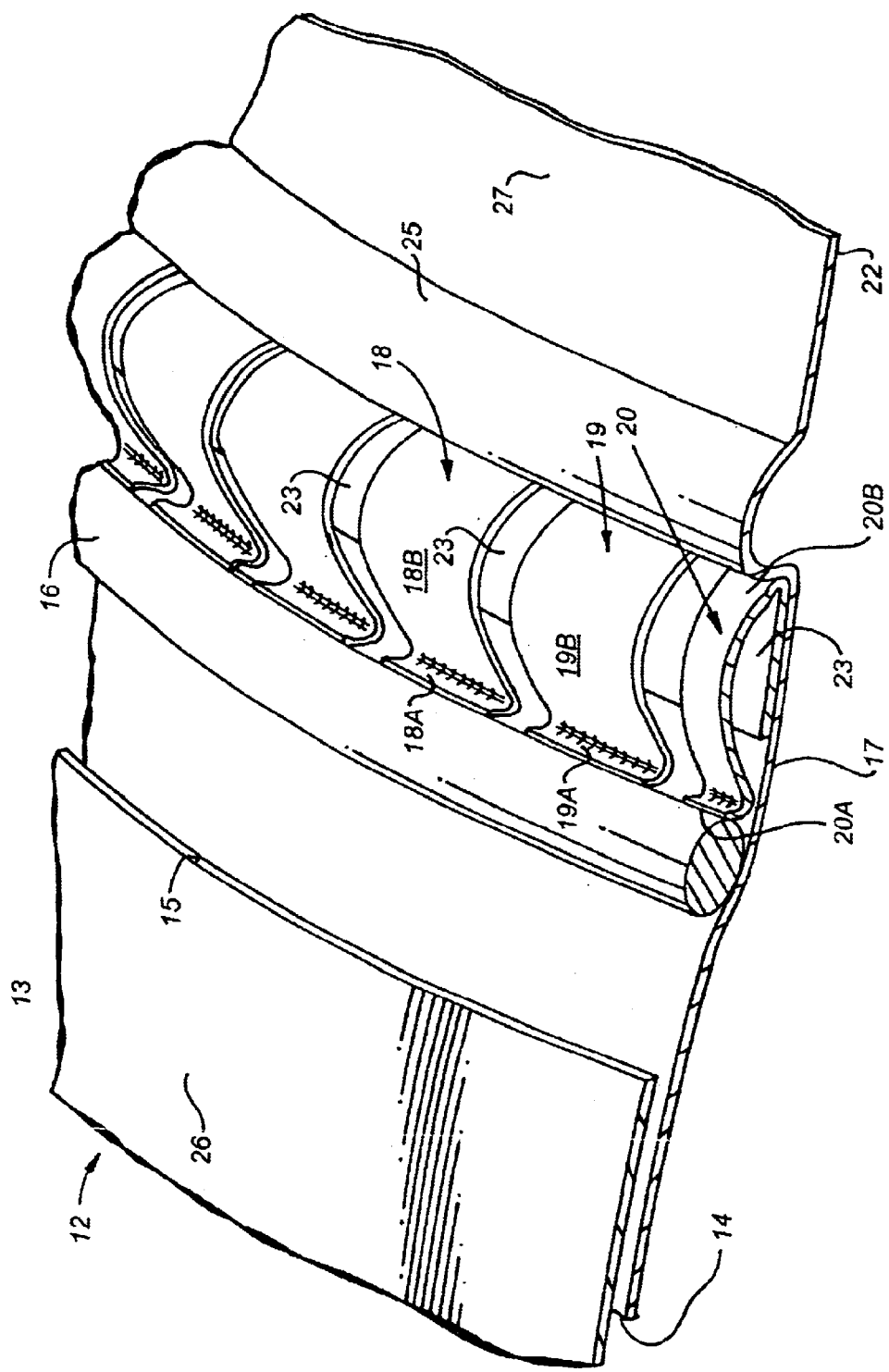
FIG. 2 is an enlarged perspective view of a portion of the duct system of FIG. 1 illustrating additional construction features thereof.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 and 2 illustrate a duct system including at least a first circular air duct 10 and a second circular air duct 12. Air duct 10 includes end 11. Duct 12 includes end 13. As will be described, ends 11 and 13 are shaped and dimensioned such that end 11 is sealingly inserted in end 13.

Duct 10 includes a cylindrical wall having a cylindrical outer surface 27 and a cylindrical inner surface 22. Duct 12 includes a cylindrical wall having a cylindrical outer surface 26 and a cylindrical inner surface 21. The diameter of the cylindrical walls of ducts 10 and 12 can vary somewhat, especially at ends 11 and 13 where indents 17 or collars 25 may be formed. Surfaces 22, 27, 21, 26 are, however generally cylindrical along the entire length of each duct 10 and 12.

Figure 3A:
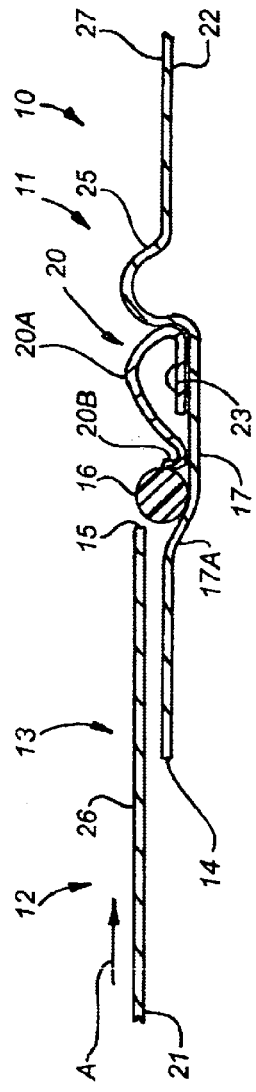
FIGS. 3A to 3C are side section views of the duct system of FIGS. 1 and 2 illustrating the mode of operation thereof.

End 13 includes circular edge 15. End 11 includes circular edge 14. End 11 also includes outwardly extending peripheral collar 25 and peripheral depression or indent 17. Indent 17 includes sloped surface 17A (FIG. 3A). Elastic O-ring 16 and spaced apart deformable members 18 to 20 are seated in indent 17. Each deformable member 18 to 20 is attached to and outwardly depends from a cylindrical panel or collar 23 that is seated in and extends along indent 17. If desired, members 18 to 20 can be interconnected and form a single continuous member that extends around end 11 with indent 17. It is, however, presently preferred that members 18 to 20 be spaced apart in the manner shown.

Indent 17, O-ring 16, collar 25, and members 18 to 20 presently each extend completely around the periphery of duct 10 in the manner illustrated in FIGS. 1 and 2. It may be desirable to extend indent 17, O-ring 16, collar 25, and/or members 18 to 20 only partially around duct 10. Or, it may be desirable to divide indent 17, O-ring 16, collar 25, and members 18 to 20 into sections. For example, instead of having one continuous indent 17 extending completely around duct 10 it may be desirable to divide indent 17 into three spaced apart sections each of which extends only partially circumferentially around duct 10. It is, however, presently preferred that indent 17, O-ring 16, collar 25, and member 18 to 20 extend completely around the circumferential periphery of duct 10 in the manner shown in FIGS. 1 and 2.

Members 18 to 20 presently include spring portions 18B, 19B, 20B, respectively. Each spring portion 18B, 19B, 20B includes a foot 18A, 19A, 20A, respectively. Portions 18B, 19B, 20B need not comprise springs or some other elastic material, but must, as discussed below, be deformable such that feet 19A to 20A contact O-ring 16 and generate compressive forces against O-ring 16.

Figure 3B:
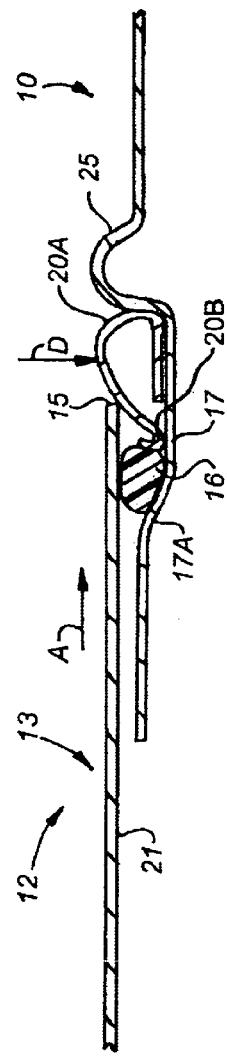
Figure 3C:
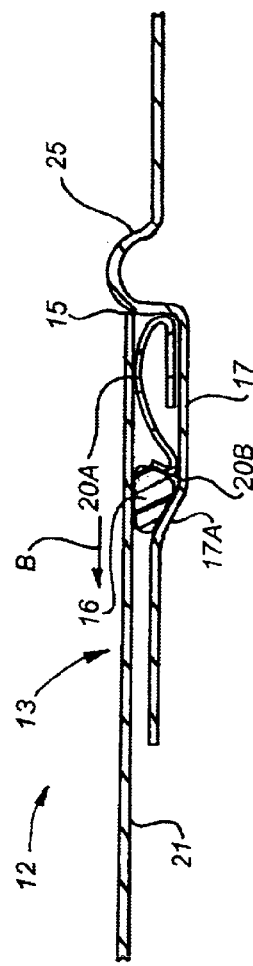

FIGS. 3A, 3B, 3C illustrate the mode of operation of the interactive sealing system of FIGS. 1 and 2.

In FIG. 3A, end 13 of duct 12 is ready to be slid in the direction of arrow A over end 11 of duct 10.

In FIG. 3B, cylindrical duct 12 and end 13 have been partially slid in the direction of arrow A to a position in which edge 15 initially touches spring portion 20A (and of course initially touches each other spring portion 18A, 19A, etc. shown in FIGS. 1 and 2). In order for edge 15 to reach the position shown in FIG. 3B, edge 15 and a portion of end 13 are slid over and compress O-ring 16. O-ring 16 is illustrated in a compressed state in FIG. 3B. In FIG. 3A, O-ring 16 has not been compressed. When O-ring 16 is being compressed by inner surface 21 of end 13, foot 20B functions to hold O-ring 16 in place against sloped surface 17A. In the practice of the invention, it is not necessary that O-ring 16 be compressed by surface 21 when end 13 slides over O-ring 16, but such compression is preferred because it produces a better seal.

After end 13 and edge 15 reach the position shown in FIG. 3B, the displacement of cylindrical duct 12 and end 13 in the direction of arrow A is continued. The continued displacement of end 13 in the direction of arrow A forces edge 15 and a portion of end 13 over spring member 20A and downwardly depresses member 20A in the direction of arrow D (FIG. 3B) to the position illustrated in FIG. 3C. Downwardly depressing member 20A expands member 20A by forcing foot 20B in the direction of arrow B (FIG. 3C) away from collar 25 and against O-ring 16. Before member 20A is downwardly depressed in the direction of arrow D, it is not necessary that foot 20B contact O-ring 16. Foot 20B can be spaced away from O-ring 16. After, however, member 20A is downwardly depressed to the position shown in FIG. 3C, foot 20B must at least contact O-ring 16 and preferably should generate compression forces against O-ring 16 that force O-ring 16 against sloped surface 17A and against the inner surface 21 of end 13. When foot 20 presses O-ring 16 against surface 17A and surface 21, the elasticity of O-ring generates opposing forces that attempt to press foot 20B in a direction opposite that of arrow B. When foot 20B is pressed in a direction that of arrow B, spring member 20A is forced against inner surface 21, improving the seal between member 20A and end 13. Consequently, O-ring 16 and member 20A each interact with the other to improve and facilitate the seal created by the other. The resilient nature of spring member 20A also generates forces against surface 21 that improve the seal between surface 21 and member 20A.

The shape and dimension of O-ring 16 and the material used to construct O-ring 16 can vary as desired as long as O-ring 16 functions to be pressed by member 20A against at least one surface 17A, 21 on at least one of ends 11 and 13. O-ring 16 need not, for example, be cylindrical and need not have a circular cross-section.

The shape and dimension of member 20A and the material used to construct member 20A can vary as desired as long as member 20A functions to at least contact O-ring 16 when member 20A is depressed in the direction of arrow D. Member 20A also preferably, but not necessarily, generates compression forces against O-ring 16 when member 20A is depressed in the direction of arrow D.

FIGS. 4A and 4B illustrate an alternate embodiment of the interactive duct sealing system of the invention. In FIGS. 4A and 4B, the construction of cylindrical duct 10A is identical to that of duct 10 except that indent 17 is eliminated. The construction of cylindrical duct 12A is identical to that of duct 12, except that collar 30 has been incorporated in end 13. Collar 30 includes inner sloped surface 30A. Surface 30A performs a function similar to that performed by surface 17A in FIGS. 3A and 3B. In operation of the embodiment of the invention shown in FIG. 4A, when end 13 is displaced from the position shown in FIG. 4A in the direction of arrow C to the position shown in FIG. 4B, the inner surface of end 13 compresses O-ring 16 and also downwardly depresses member 20A in the direction of arrow E to the position illustrated in FIG. 4B. In FIG. 4B, foot 20B is expanded away from collar 25 against O-ring 16 and forces O-ring 16 against the inner cylindrical surface 27A of end 11, against surface 30A, and against surface 21A.

Figure 5A:
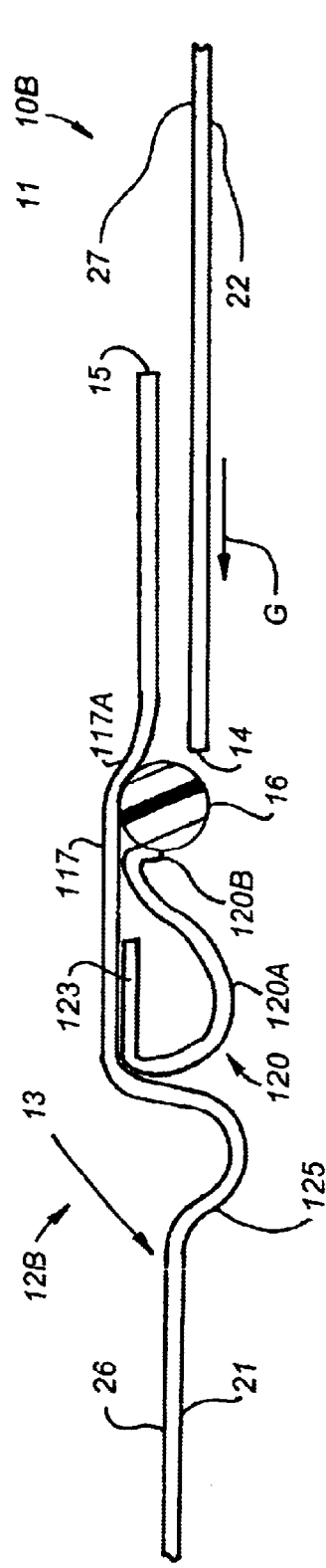
FIGS. 5A and 5B are side section views illustrating the mode of operation of a further embodiment of the duct system of the invention.
Figure 5B:
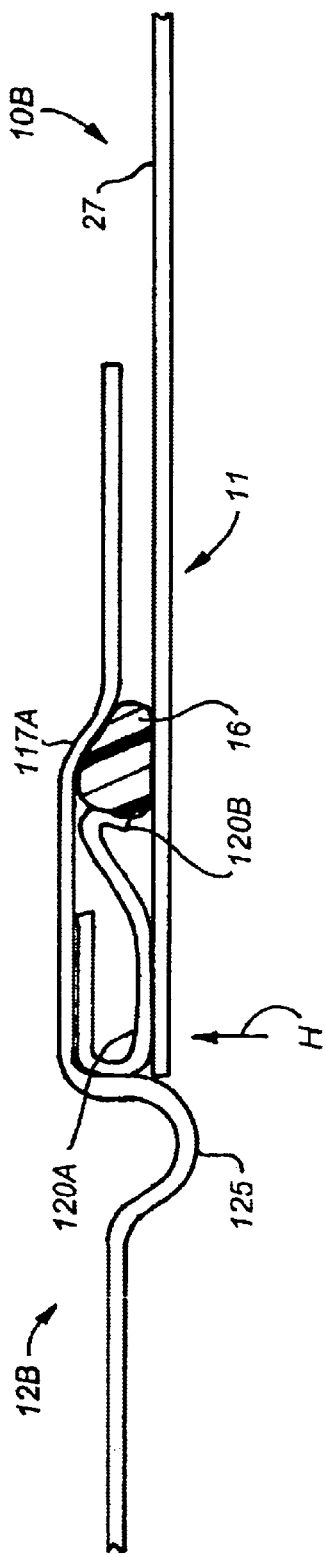

FIGS. 5A and 5B illustrate an alternate embodiment of the interactive duct sealing system of the invention. In FIGS. 5A and 5B, end 13 of cylindrical duct 12B has a structure that is basically identical to that of end 11 of duct 10, except that the structure of end 13 in duct 12B is inverted from the structure of end 11 of duct 10 and except that duct 12B is the larger diameter duct (whereas duct 10 is the smaller diameter duct in FIG. 3A); and, cylindrical duct 10B has a structure that is basically identical to that of duct 12, except that duct 10B is the smaller diameter duct (where duct 12 is the larger diameter duct in FIG. 3A). Consequently, collar 125 is comparable to collar 25; and, indent 117 and surface 117A are comparable to indent 17 and surface 17A. Member 120A and collar 123 are comparable to member 20A and collar 23 except that member 120A, instead of facing outwardly in the manner of member 20A, faces inwardly. When end 11 in FIG. 5A is displaced in the direction of arrow G to the position shown in FIG. 5B, inner surface 27 depresses member 120A in the direction of arrow H such that foot 120B is moved away from collar 125 against O-ring 16 to force O-ring 16 against surface 117A and surface 27.

FIGS. 6A and 6B illustrate an alternate embodiment of the interactive duct sealing system of the invention. In FIGS. 6A and 6B, end 13 of cylindrical duct 12C has a structure that is identical to that of end 13 of duct 12A in FIG. 4A, except that O-ring 16 is mounted on surface 30A. In FIGS. 6A and 6B, cylindrical duct 10C has a structure that is basically identical to that of duct 110B in FIG. 5A, except that collar 23 is fixedly secured to the cylindrical wall of duct 10C with rivets 32. When end 11 in FIG. 6A is displaced in the direction of arrow J to the position shown in FIG. 6B, inner surface 21 depresses member 20A such that foot 20B moves against O-ring 16 to force O-ring 16 against surfaces 27, 30A, 21. Surface 21 also compresses O-ring 16 against surface 27.

FIGS. 7A and 7B illustrate an alternate embodiment of the interactive duct sealing system of the invention. In FIGS. 7A and 7B, end 13 of cylindrical duct 12D has a structure that is identical to that of end 13 of duct 12 in FIG. 3A, except that an elastic member 16A is mounted on the inner surface 21 of end 13. In FIGS. 7A and 7B, cylindrical duct 10D has a structure that is identical to that of duct 20C (FIG. 6A). When end 13 in FIG. 7A is displaced in the direction of arrow K to the position shown in FIG. 7B, elastic member 16A downwardly depresses member 20A such that foot 20B is moved away from rivet 32. When member 20A is downwardly depressed toward surface 27, member 20A contacts member 16A and generates compressive forces against member 16A.

Having described my invention in such terms as to enable those of skill in the art to make and practice it, and having described the presently preferred embodiments thereof, I claim:

1. A method of sealing an air duct system, comprising the steps of
   (a) providing a first hollow arcuate air duct with an overlap end;
   (b) providing a second hollow arcuate air duct with an insert end;
   (c) placing at least one elongate elastic member on one of said overlap and insert ends;
   (d) placing at least one compression member on one of said overlap and insert ends, said compression member being deformable to contact and generate compression forces against said elastic member; and
   (e) inserting said insert end in said overlap end such that said compression member is compressed and deformed and contacts and generates compression forces against said elastic member.

* * * * *